US011106756B2

(12) United States Patent
Chikkala et al.

(10) Patent No.: US 11,106,756 B2
(45) Date of Patent: Aug. 31, 2021

(54) ENHANCED BROWSER TAB MANAGEMENT

(71) Applicant: International Business Machines Corporation, Armonk, NY (US)

(72) Inventors: Ravithej Chikkala, Austin, TX (US); Su Liu, Austin, TX (US); Howard N. Anglin, Leander, TX (US); HariGovind Venkatraj Ramasamy, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/442,113

(22) Filed: Jun. 14, 2019

(65) Prior Publication Data

US 2020/0394234 A1    Dec. 17, 2020

(51) Int. Cl.
| | |
|---|---|
| *G06F 16/957* | (2019.01) |
| *G06F 16/958* | (2019.01) |
| *G06F 16/955* | (2019.01) |
| *G06F 16/954* | (2019.01) |
| *G06F 3/0486* | (2013.01) |

(52) U.S. Cl.
CPC .......... *G06F 16/957* (2019.01); *G06F 3/0486* (2013.01); *G06F 16/954* (2019.01); *G06F 16/955* (2019.01); *G06F 16/958* (2019.01)

(58) Field of Classification Search
None
See application file for complete search history.

(56) References Cited

U.S. PATENT DOCUMENTS

| | | | | |
|---|---|---|---|---|
| 8,191,007 | B1* | 5/2012 | Veloz, III | G06F 16/957 715/777 |
| 9,552,358 | B2* | 1/2017 | Cudak | G06F 16/957 |
| 2005/0216457 | A1* | 9/2005 | Walther | G06F 16/9558 |
| 2009/0287559 | A1* | 11/2009 | Chen | G06Q 30/0253 705/14.23 |
| 2009/0327947 | A1* | 12/2009 | Schreiner | G06F 3/0483 715/777 |
| 2011/0131523 | A1* | 6/2011 | Grant | G06F 3/0481 715/777 |
| 2011/0271217 | A1* | 11/2011 | Cruz Moreno | G06F 3/0482 715/765 |
| 2011/0271224 | A1* | 11/2011 | Cruz Moreno | G06F 3/0483 715/777 |

(Continued)

*Primary Examiner* — Henry Orr
(74) *Attorney, Agent, or Firm* — Jeffrey S LaBaw; Feb R Cabrasawan; David Mattheis

(57) ABSTRACT

A method, apparatus and computer program product for dynamically grouping browser tabs in a web browser user interface is described. The web page content of a plurality of open web page tabs in a web browser displayed on a display of a computer are analyzed. Sets of tab group criteria, each set of tab group criteria for a respective tab group and based on user intent are used to evaluate the web page content. Based on the analyzing, which ones of the plurality of open web page tabs respectively satisfy a set of tab group criteria are determined. The plurality of open web page tabs is grouped into respective tab groups based on the determination. The tab groups are presented in the web browser display. Each tab group display contains tabs representing a subset of the plurality of open web page tabs which satisfy a respective set of tab group criteria.

22 Claims, 8 Drawing Sheets

(56) References Cited

U.S. PATENT DOCUMENTS

| | | | |
|---|---|---|---|
| 2012/0101952 A1* | 4/2012 | Raleigh | G06Q 30/016 |
| | | | 705/304 |
| 2012/0271904 A1* | 10/2012 | Black | H04L 67/06 |
| | | | 709/213 |
| 2012/0331408 A1* | 12/2012 | Ainslie | G06F 16/954 |
| | | | 715/760 |
| 2015/0205462 A1* | 7/2015 | Jitkoff | G06F 16/955 |
| | | | 715/777 |
| 2015/0220228 A1 | 8/2015 | Podemsky | |
| 2016/0077695 A1 | 3/2016 | Singh | |
| 2017/0075528 A1* | 3/2017 | Kothari | G06F 3/0483 |
| 2017/0293419 A1 | 10/2017 | Dipin | |
| 2017/0329859 A1* | 11/2017 | Ploeg | G06F 16/9562 |
| 2018/0091546 A1* | 3/2018 | Davidson | G06F 16/951 |
| 2018/0225388 A1 | 8/2018 | Bhupatiraju | |
| 2018/0246624 A1* | 8/2018 | Barrus | G06F 3/04845 |
| 2018/0307525 A1* | 10/2018 | Gates | G06F 8/61 |
| 2019/0278870 A1* | 9/2019 | Novielli | G06N 20/00 |
| 2020/0050966 A1* | 2/2020 | Enuka | G06N 20/00 |

* cited by examiner

ENHANCED BROWSER TAB MANAGEMENT

BACKGROUND OF THE INVENTION

This disclosure relates generally to graphical user interfaces. More particularly, it relates to a graphical user interface for an enhanced browser tab manager.

A web browser, or simply a browser, is an application program for accessing information on the World Wide Web or "web". Each web page, image and video is identified by a distinct Uniform Resource Locator (URL). A URL enables browsers to retrieve these resources from a web server and display them on the user's device. Typically, a user "browsing" the web is multi-tasking, having many web pages or images open at the same time.

It has become conventional to display each web page in a browser interface having a set of labelled tabs in a single window. Each tab can be selected to display the content from one of the opened web pages. This is a more convenient interface than opening a new window for every new web page.

However, current tabbed interfaces have limitations. Some users open many web pages or images. The user may be performing several tasks concurrently. For example, the user may be researching loan rates for an automobile, possible investments for retirement and scientific references for an article which the user is preparing. Several web pages and their associated tabs are opened for each subject. Typically, the browser merely opens a new tab in the order in which the user visits a URL. As the user does not always proceed linearly in the tasks, the order of tabs in the browser can become confusing and respective web pages for the different projects interspersed with one another. As the number of open pages increases, less room is available to present the tab information intelligibly.

Browsers using a tabbed interface may hold a cache of the currently opened tabs. There are few uses for this cache such as restoring all the last open tabs when the browser is initialized in a new session. Some browsers allow a user to manually save all the open tabs in folder in a bookmarks folder.

Some browsers allow a user to group tabs to organize the currently viewed tabs into tab groups between which the user can switch between. However, this is typically a manual process in which the user names a new tab group and manually drags and drops tabs on the interface feature associated with the tab group. Other browsers have extensions which allow the browser to group the tabs by domain or all the tabs opened from a single search engine page.

Further improvements in browser graphical interfaces are needed.

BRIEF SUMMARY

According to this disclosure, a method, apparatus and computer program product for dynamically grouping browser tabs in a web browser user interface. The web page content of a plurality of open web page tabs in a web browser displayed on a display of a computer are analyzed. Sets of tab group criteria, each set of tab group criteria for a respective tab group and based on user intent are used to evaluate the web page content. Based on the analyzing, which ones of the plurality of open web page tabs respectively satisfy a set of tab group criteria are determined. The plurality of open web page tabs is grouped into respective tab groups based on the determination. The tab groups are presented in the web browser display. Each tab group display contains tabs representing a subset of the plurality of open web page tabs which satisfy a respective set of tab group criteria.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
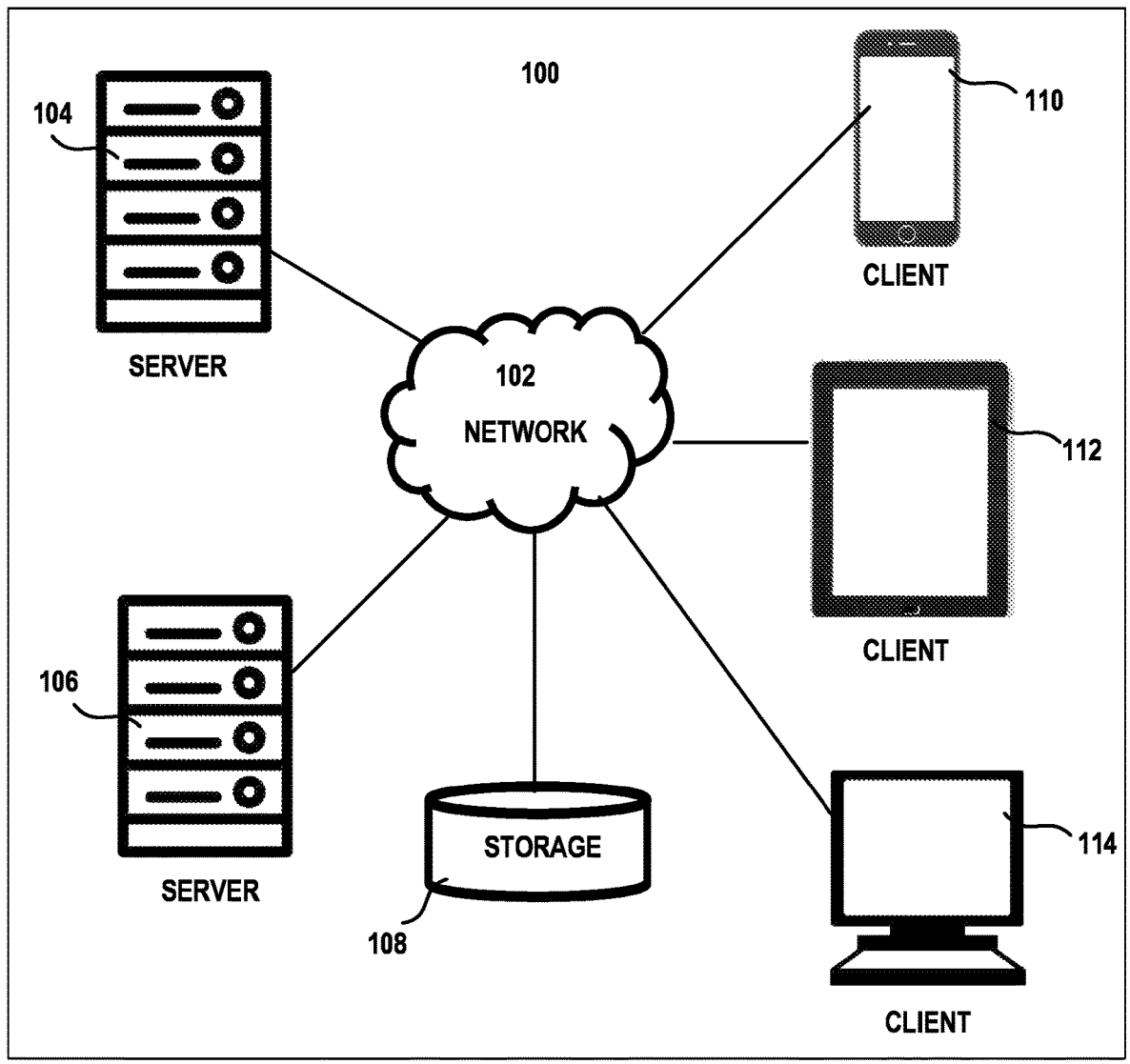
FIG. 1 depicts an exemplary block diagram of a distributed data processing environment in which exemplary aspects of the illustrative embodiments may be implemented.

At a high level, the invention provides a method, system and computer program product which allows a browser user to dynamically specify, customize and adjust tab grouping criteria for organizing tabs in real-time, that is, during a current web session. In some preferred embodiments, the user specification of the tag groups is expressed by customized rules stored in a user profile. Web pages content is to semantically determine the similarity of web pages, and thereby, the user intent. Other parameters such as browsing and searching behaviors, browsing history, tab grouping history and type of scripts currently running in open web pages are used in embodiments of the invention for the system to suggest tab groups and for the user to specify tab groups. Embodiments of the invention include machine learning, which learns the prior or current user browsing behavior and analyzes the web content and other attributes of web pages retrieved by the user into a set of candidate tab grouping rules. The tab grouping rules are updated according to changes performed by the user on the user's customized grouping rules, e.g., from user's tab grouping operations in real-time.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments. In this description, the terms "web pages" and the "tabs" used to represent them in the interface are often used interchangeably.

In embodiments of the invention, the browser cache is organized and managed by an enhanced browser tab manager (EBTM) integrated with a dynamic context monitor for enhancing the user web browsing experience. In these embodiments, the EBTM comprises a context aware based browser tab managing algorithm and framework including an EBTM manager, a Service profile and a User Profile. In some embodiments, the EBTM uses an additional cache, separate from the browser cache, in which a data structure stores and tracks web page attributes. Sets of customized tab grouping rules are used to dynamically group sets of web pages as tab groups, based on a set of context and content based rules. A user may establish tab groupings based on the content and/or content type of the web page. As an example, all social networking tabs may be grouped into a first tab group, shopping web pages into a second tab group and news related web pages into a third tab group. The customized grouping and content rules can be manually established by the user through interaction with the user interface. In embodiments, the tab groups are also learned based on the web content of the open web pages retrieved by the user and as well as user behaviors relative to the tab groupings. The EBTM monitors user behaviors such as grouping respective web pages into a tab group, removing a web page from one tab group and placing it in a second tab group, and correlating a current context to the browsing behavior. Once a new user intent is learned (and in preferred embodiments ratified by the user), the tab grouping and content rules are changed accordingly.

In embodiments of the invention, certain user defined instructions and conditions are used to initially establish a tab group. For example, the user may state for the EBTM to always move and group any USA news pages into a tab group automatically. However, the EBTM monitors the user behavior and discovers a pattern where the user is moving web pages pertaining to a particular state to a separate tab group or moving web pages concerning a neighboring country into the USA news page group. The EBTM may modify the initially created rules according to the observed user intent of having a separate tab group for the particular state or including the neighboring country in the USA tab group.

New rules can be established based on user intent and the content of a set of open web pages. As an example, when a user is displaying a number of web pages of a particular type, e.g., a set of web pages running certain scripts (playing audio/video), a new grouping rule to group these pages together can be created by the EBTM. As another example, in a current web session, the user may be searching for bicycle prices and a set of web pages having similar content will be opened on the screen. The content of the web pages is analyzed in real-time and found to be similar, e.g., through a natural language processing (NLP) application and a new tab grouping and content rule created and proposed to the user. As another example, all web pages relating to articles that cover a recent bike accident can be moved to a new tab group.

In some embodiments, a tab searching feature in the browser graphical user interface (GUI) allows a user to search for related tabs for a new or existing tab group. Preferred embodiments of the invention include a user interface, the EBTM GUI, with a searching box to find open or recently accessed web pages for potential creation of a new content based tab rule for a new tab group. As compared to the browser search bar which enlists a search engine which has indexed web pages in the World Wide Web, the tab searching feature allows the user to drill down on the web pages opened by the user during a recent browser session, e.g., the currently opened web pages. In embodiments of the invention, the EBTM can be invoked by a voice command (e.g., using an application such as IBM Watson™ Conversation) and can be used to organize or find a group of related tabs from the browser cache or EBTM cache based on the stated search criteria. The separate EBTM cache allows EBTM functions when the browser is working in incognito mode, i.e. not storing web page information in the browser cache.

Figure 2:
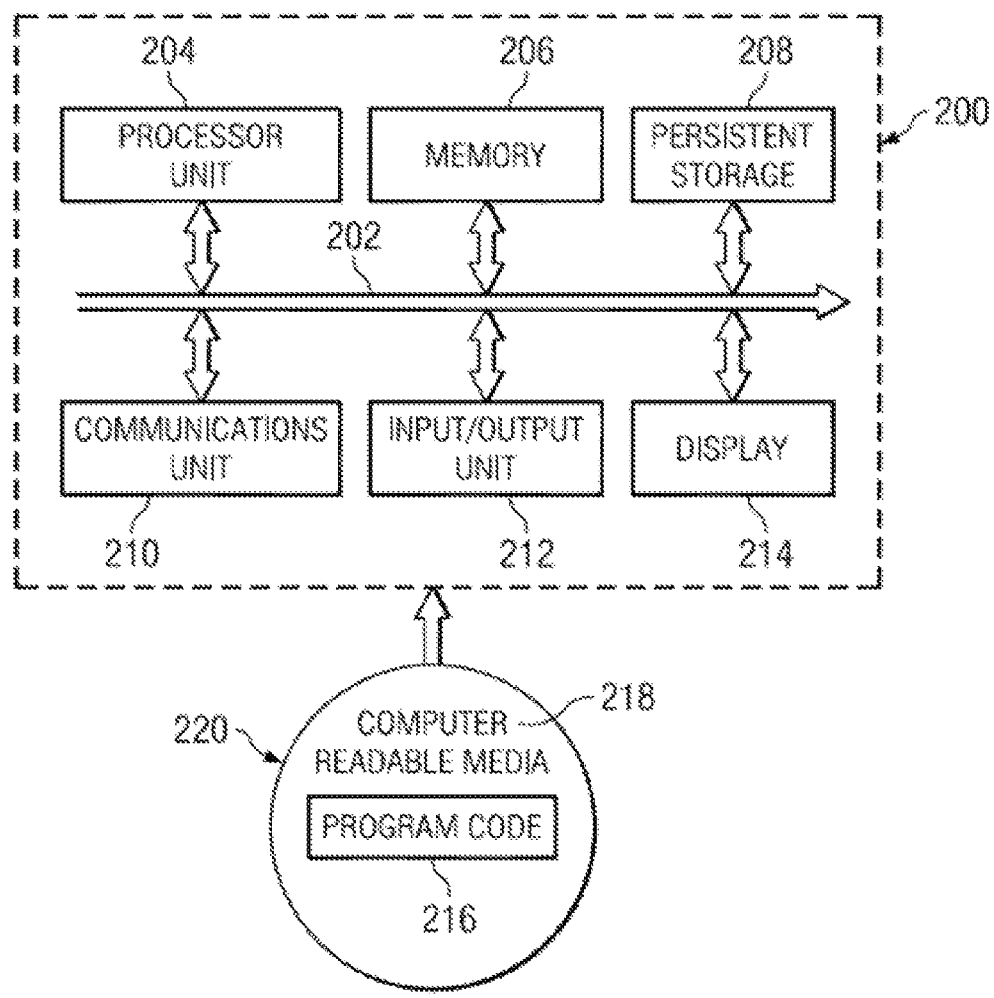
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as JavaTM, Smalltalk, C++, C #, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

In embodiments of the invention, an enhanced tab management function is provided for a web browser. As the open web pages proliferate on the desktop, tab management and locating a desired web page or group of web pages becomes difficult. Tab groups are one way to improve the interface of the browser.

To propose new tab groups, within each opened web page, the web page content is analyzed to determine commonalities between open web pages. This analysis is also used to determine commonality between a respective web page and prior established tab groups. That is, whether the web page should be in an established tab group. In embodiments of the invention, the analysis also considers content within recently closed web pages, e.g., within a current web browsing session or within a predetermined period (such as an hour), as part of the process to propose new tab groups to the user. The enhanced tab management function can be provided as a plug-in module to an existing browser or incorporated as a function within the browser itself.

In the invention, there is an emphasis on grouping the tabs based on user intent rather than merely on user activity. The reader will note that many of the embodiments which use automatic techniques such as machine learning and natural language processing to determine a new tab group also require user ratification of a proposed new tab group or a modification to an existing tab group. Also, prior choices of a user, i.e. that the user has accepted a particular type of tab group, or has not, indicates user intent and are used in the process of creating and modifying tab groups.

The enhanced tab management function groups tabs according to several user specified criteria. In preferred embodiments, a set of templates of tab groups are provided for selection and possible manual modification by the user to create an initial set of tab groups. Then, as the user browses, the open web pages are searched and analyzed according to their content and new tab groups are proposed to the user for ratification and possible modification. Based on the analyzed web content, for instance, the enhanced tab management function will propose creating a first new tab group, and the corresponding set of tab group characteristics, for a set of open web pages on "bike parts" and a second new tab group for set of open pages on "tennis racquets". When prompted, user may also provide more context to narrow down the proposed tab group to include specific qualities. For example, following the above examples, the user may specify that of the "bike parts" pages, only pages which include price information on a particular bike part should be included in the first tab group. Or the user may specify that only tennis racquet web pages which also contain reviews and images should be included in the second tab group. Once created and ratified by the user, the new tab group criteria is stored with the other tab group criteria for other tab groups.

As another feature in some embodiments, a web page content search enables the user to search for web page content and select among the already open web pages having similar web content to create new tab groups.

Embodiments of the invention provides a dynamic, user intent based solution to tab management. While some user tasks are repetitive, and hence there is an option to set some predefined tab groups, most web sessions are seeking new information and web pages. Thus, the system will propose a new tab group if there are a number of open web pages which do not fit in an existing tab group, which is greater than a threshold number of open web pages that have not been classified into a tab group (i.e., non-classified web pages). In addition to the system prompts, at any time, the user can provide a new user intent and ask the enhanced tab management function to group tabs based on the new user intent. The inventors find that by analyzing the web content, the tab groups proposed by the system are user intent based; that is, the content inside the web pages is used to group tabs. Once a potential tab group is proposed by the system, the user can either ratify the tab group as proposed by the system or can specify additional web page characteristics and/or modify the proposed web page characteristics to define a new tab group. For example, in response to a system prompt indicating that there are a number of web pages with audio and video streams, the user may request that a particular tab group be limited to those which play only audio streams.

Figure 3:
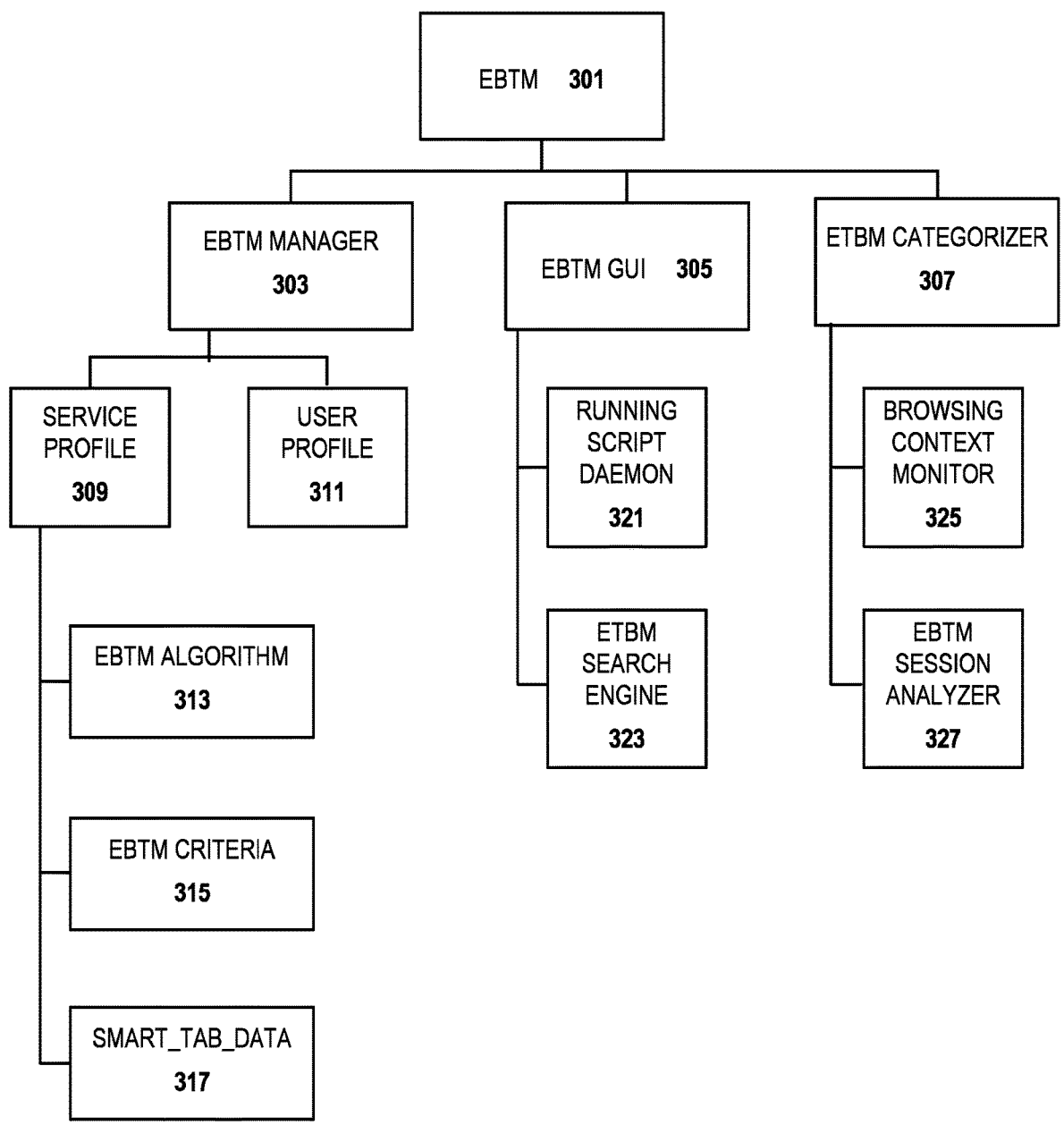
FIG. 3 depicts the components of an embodiment of the invention.

Referring to FIG. 3, the components of an embodiment of the invention are described. The EBTM 301 is a program, e.g., a web browser plugin, for configuring browser tab groups. In the embodiment, the EBTM 301 has EBTM manager 303, EBTM GUI 305 and ETBM Categorizer 307 modules. The EBTM Manager 303 includes the managing algorithm and the criteria used for tab grouping. The Service Profile 309 is a file or database for saving the EBTM configuration and criteria. The User Profile 311 is a file or database for saving any personal preference data and user specific context and content rules. In embodiments of the invention, each browser user has an associated user profile and associated user criteria for tab grouping.

The Service Profile 309 includes an EBTM algorithm 313 for dynamically moving and grouping currently open tabs (and in some embodiments recently closed tabs) based on a set of customized rules. The Service profile 309 also includes the EBTM Criteria 315 which is a predefined set of customized grouping rules for supporting the EBTM Algorithm. In the embodiment, sets of rules are individually user selectable to organize the tabs, e.g., for a current browsing session. As another example, the user may specify that a new user tab group should persist over several web sessions, i.e. a specified number of sessions or time period.

In one embodiment, one predefined rule defines multiple tab groups, e.g., a rule that allows the system to move all social networking tabs into one window displaying a first tab group, ecommerce tabs into a second window displaying a second tab group and news related tabs into a third window displaying a third tab group. That is, a rule can specify multiple tab groups. In another embodiment, grouping social networking, grouping ecommerce tabs and grouping news related tabs into separate, respective tab groups are separate user selectable rules.

In preferred embodiments, the user selectable rules are also user modifiable. For example, the user may select a news page tab group rule and use the rule as a template to further specify that news web pages that have articles about a particular event should be grouped together in a first tab group, while news web pages about other topics should be grouped in a second tab group. In embodiments of the invention, the EBTM Criteria are web based criteria which can be used as part of criteria for the user profile. The EBTM Criteria are web site defined groupings in some embodiments, e.g., a list of new web sites provided as part of the criteria. More, non-limiting examples of rules that are part of the EBTM Criteria or subsequently defined user rules in the user profile are discussed below. Once selected and modified these user specific rules are stored in the User profile 311.

The EBTM Data Structure 317 (labelled as SMARTJAB_DATA 317) is a data structure component of the Service profile 309 for holding and tracking browsing content, context, window and tab attributes. For example, a non-limiting example of tab parameters in the data structure are SMART_TAB_DATA [windowID, TabID, TabGroupID, TabContent (keywords), TabRuningSessionList]. It is intended that the EBTM data structure 317 be a resource for grouping the tabs quickly, i.e. in response to a new tab grouping request by a user, so that the categorization of the tab parameters of the current and recently closed web pages can occur in the background as a separate process.

The EBTM GUI 305 is a graphical user interface (GUI) for managing the enhanced tab operations. In preferred embodiments, it includes a search box for finding the characteristics, e.g., such as running scripts, images, music, and content (usually written), which the user specifies in a new tab grouping for a set of web pages. It also manages the presentation of the tab groups by the browser, e.g., in a set of windows with each tab group assigned to a respective window.

Running Script Daemon 321 is a component in the EBTM GUI 305. It is a module for detecting any tabs that have running scripts (e.g., playing audio/video) and classifying the types of running scripts. The ETBM Search Engine 323 is another module in the EBTM GUI 305. It is used for finding the web pages which satisfy the criteria from the Service profile 309 and/or User profile 311. It is also used to search for new criteria for new tab groups which the user has entered in the search box. For example, the user is searching for "bicycle prices" and wants a new tab group containing web pages pertaining to the new topic. The search engine 323 can be a simple key word search engine or a more sophisticated search engine which uses an interface to a natural language processing (NLP) engine which provides advanced text analytics to understand the web page content by query expansion, word relationships, semantic roles, sentiments as well as keyword searching. IBM Watson™ is an example of a natural language understanding API suitable in embodiments of the invention. For example, in one preferred embodiment of the invention, the EBTM uses the Watson services such as Watson conversation+Watson tone analyzer+Watson natural language understanding APIs to compare web pages based on semantic similarity.

The ETBM Categorizer 307 is a module for grouping open web pages (and possibly some recently closed web pages) with characteristics which match one of the tab group criteria. As mentioned above, each tab group criteria results in a set of web pages with similar content and characteristics, e.g., the user may specify a tab group to include "new" articles (defined by a time period) that cover a "bike accident" into a new tab group to be displayed in a new window. User tab group criteria can be derived from a predefined tab group criteria from the service profile and stored in the user profile, i.e. according to a certain user defined selections (from the service profile defaults), instructions and conditions. For example, the user may select an option to "always move and group any USA news web pages into window-1, automatically".

The Browsing Context Monitor 325 is a module for monitoring user browsing behaviors and correlated contexts and is used in some embodiments of the invention. In these embodiments, the Browsing Context Monitor 325 detects content within open web pages.

The browser context monitor also detects events such as the user moving a tab from one tab group to another tab group or selecting open web pages from a search and adding them to a new tab group.

The EBTM Session Analyzer 327 is a module for analyzing observed context events from the browser context monitor 325, and compares them with learned or predefined context patterns, and then to determine characteristics of an opened web page. The EBTM Session Analyzer 327 determines whether there is a pattern to the content/context of the web pages, whether that pattern matches one of the tab groups and whether because of the detected pattern, the EBTM should propose changes to an existing tab group. As with the ETBM Categorizer 307 above, the EBTM Session Analyzer 327 preferably uses the Watson™ services to establish semantic similarity between unclassified web pages.

In some embodiments, the Browsing Context Monitor 325 and Session Analyzer 327 detect new context/content patterns in web pages not currently associated with a tab group. A dialog is initiated with the user, notifying the user that a potential pattern has been detected and inquiring whether the user wants to use the pattern as a basis for a new tab group.

One skilled in the art will understand that the division of tasks between the modules is exemplary, and that other embodiments of the invention will divide the tasks differently. Further, in describing exemplary processes below, the order in which the processes are described with reference to the flow diagrams is not intended to be construed as a limitation, and any number of the described method blocks may be combined in a different order to implement the method, or alternate method. Additionally, individual blocks may be deleted from the method without departing from the spirit and scope of the subject matter described herein.

Figure 4:
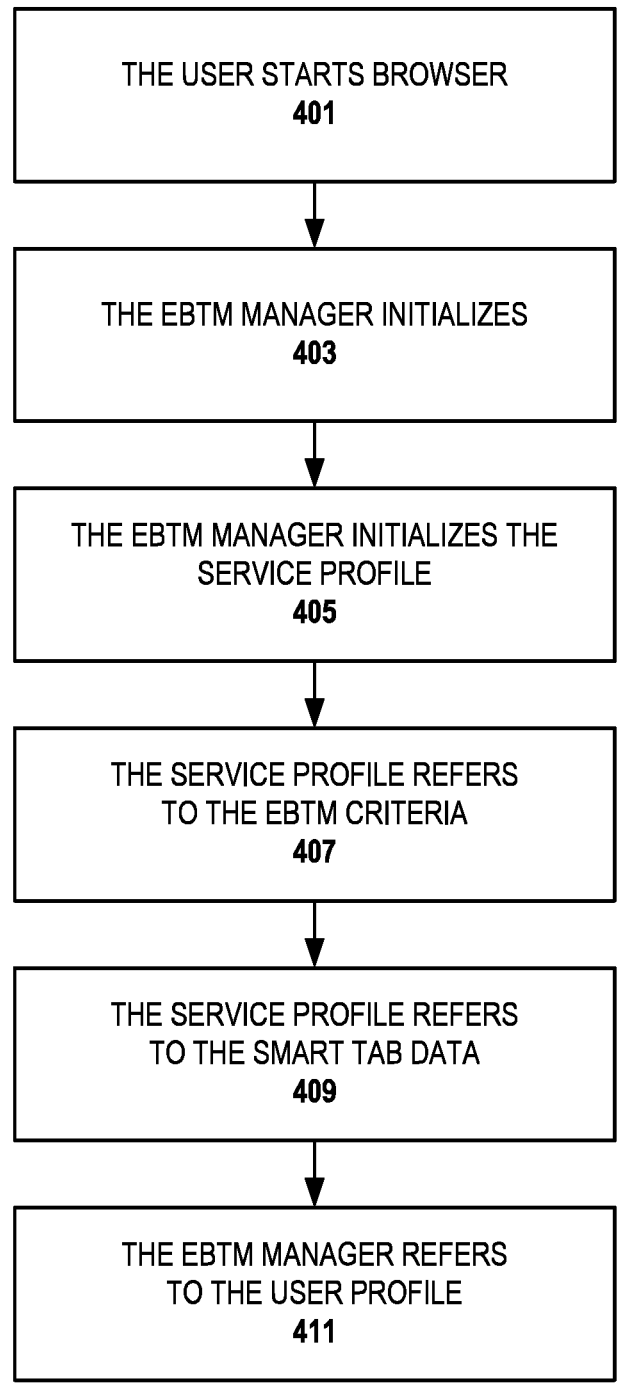
FIG. 4 depicts an initialization process for an embodiment of the invention.

FIG. 4 depicts an initialization process for an embodiment of the invention. In step 401, the user starts the browser and begins opening web pages. In step 403, the EBTM manager initializes. In embodiments where the EBTM is a plug-in this is a separate step. But in embodiments of the invention where the EBTM is integrated as part of the browser, steps 401 and 403 are merged. In step 405, the EBTM manager initializes the service profile to determine whether there are preexisting criteria for creating tab groups. As discussed above, some of the criteria preferably are choices or templates which are part of the browser or EBTM plug-in which can be selected by the user (as used as the default format or as modified by the user.) As part of the process, in step 407, the service profile refers to the EBTM criteria to determine the default tab groups, the default tab groups selected by the user or the default tab groups modified by the user. In step 409, the service profile refers to the smart tab data which is used to categorize an open web page in terms of the EBTM criteria.

In step 411, the EBTM manager refers to the user profile. In embodiments of the invention, the user profile information stores new definitions of tab groups which have been defined by the user. In other embodiments of the invention, the elements of the user profile are added to the service profile information. The user profile keeps information, which is unique to the user, i.e. because of tab groups that the user has manually defined, but also ones which the system has detected based on user behavior (and preferably received confirmation by the user that the desired tab group should be started.

Figure 5:
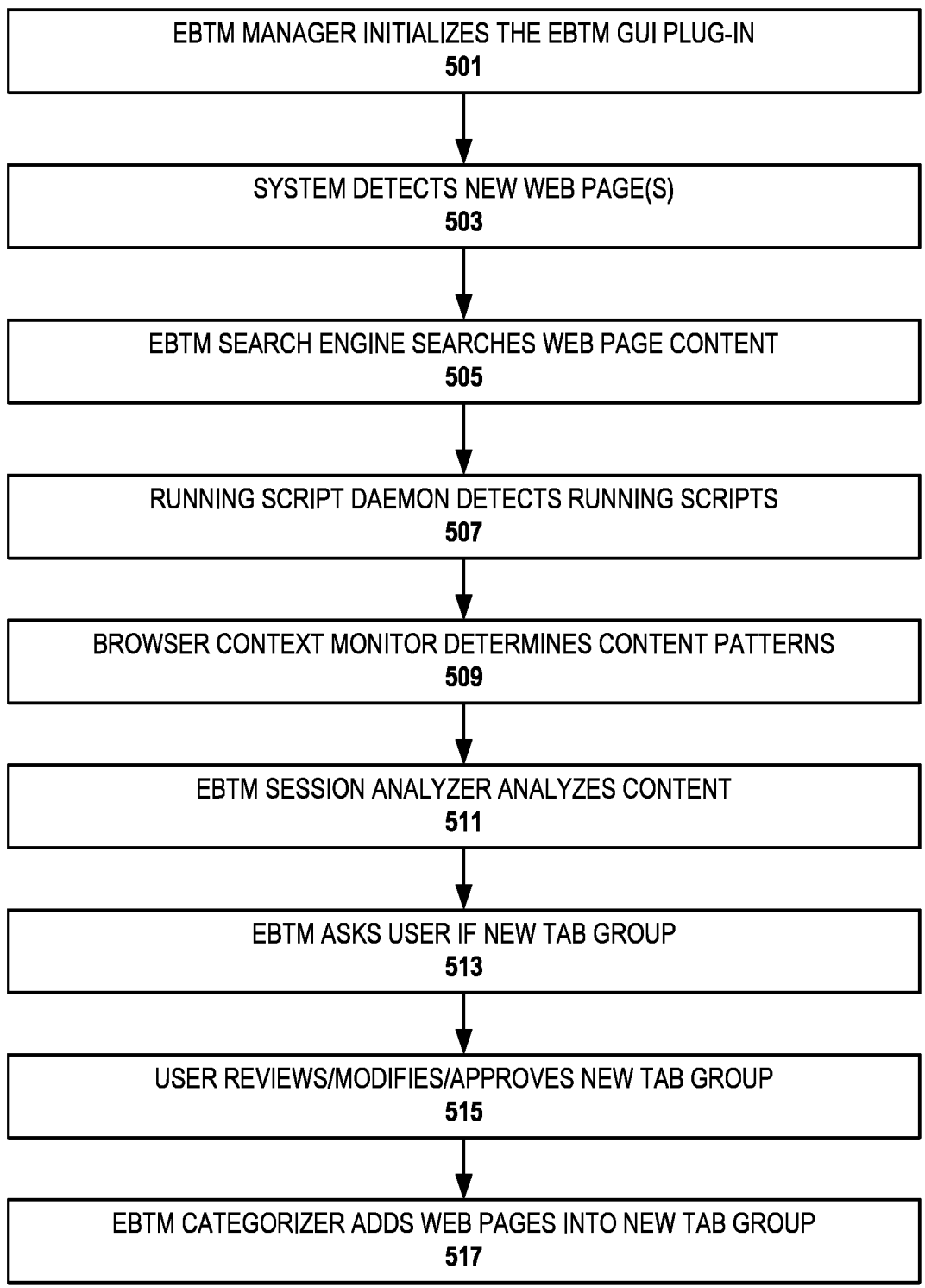
FIG. 5 depicts the browsing process and tab grouping in one embodiment of the invention.

FIG. 5 depicts the browsing process and tab grouping in one embodiment of the invention. In step 501, the EBTM manager initializes the EBTM GUI plug-in which displays the tab grouping user interface. In embodiments of the invention in which the EBTM is part of the browser application, there would be no need for a separate initialization step.

Step 503 represents the EBTM manager detecting the user opening a new web page(s). As the user opens new pages, in step 505, the EBTM search engine searches the web page content to determine whether the content of the web page matches a tab group which has been established in the service profile, e.g., a tab group that the user has selected and/or selected and modified which comes from the EBTM default settings. The EBTM search engine also searches for content which matches a tab group established by the user in the user profile. Yet further, in some embodiments, the EBTM search engine also searches for potential content, e.g., key words, metadata, in each new web page to suggest potential new tab groups to the user. As a subgroup of the embodiments which suggest new tab groups, there is a running time window of open and recently closed windows whose content provide the basis of new tab groups. The time window may be a current web session with the browser, or it may be a predetermined period, e.g., an hour. In embodiments of the invention, this period is user configurable.

In step 507, the running script daemon detects running scripts in the respective open web pages. The tab groups specified in the service profile or the user profile can specify to group certain web pages having running scripts of a particular type, e.g. audio or video streams, in a particular tab group. Also, the type of running script is a criterion for new tab groups in those embodiments in which new tab groups are proposed to the user. In step 509, the browser context monitor determines content patterns, that is, web pages which appear to have common content patterns with other open or recently closed web pages.

In step 511, the EBTM session analyzer analyzes the observed content, events and patterns, and compares them with learned or predefined context/content patterns, and then determines the characteristics of an opened web page. If the EBTM session analyzer discovers a proposed set of criteria for a new tab group, in step 513, EBTM prompts the user if the new tab group should be added. In step 515, the user reviews, modifies and approves the new tab group which is added to the user profile. The reader will understand that not all newly opened web pages will initiate such a prompt to the user.

In step 517, if the new web page meets the criteria of a tab group, the EBTM categorizer adds the web pages into the tab group. The tab group may be a preexisting tab group, i.e. a default tab group selected by the user, a tab group selected and then modified by the user, a tab group originally identified by the EBTM manager and then approved (and potentially modified by the user) during this session or a previous session, or the tab group may be the new candidate tab group to be approved by the user.

Figure 6:
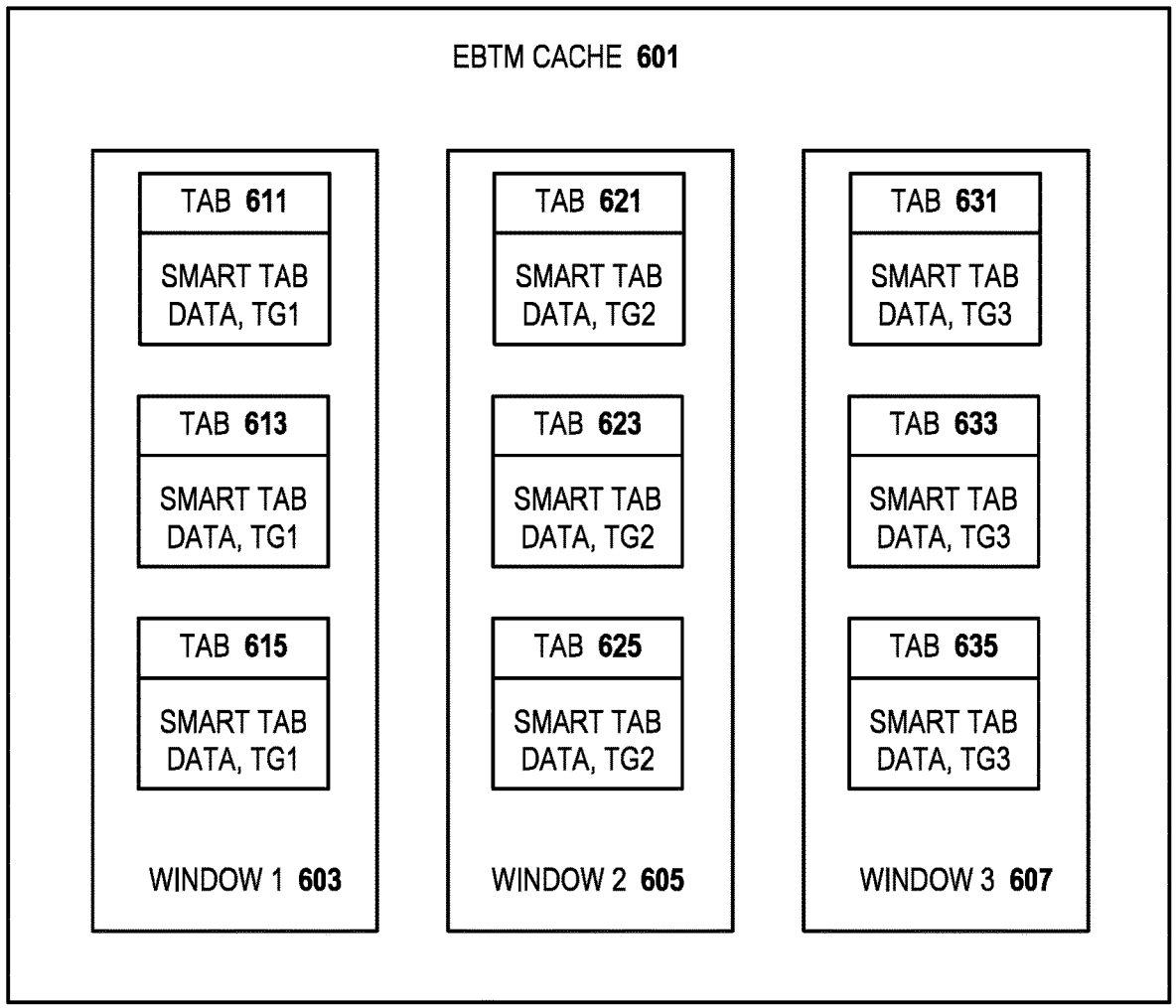
FIG. 6 depicts a logical representation of a cache with three tab groups.

FIG. 6 depicts a logical representation of an EBTM cache with three tab groups. In this illustrative embodiment, the tab groups are displayed in their own respective windows. Only three tab groups and three tabs within each tab group are shown for ease in illustration. Thus, the tab group data for tab group 1 is shown in window 1 data structure 603, the tab group data for tab group 2 is shown in window 2 data structure 605 and the tab group data for tab group 3 is in the window 3 data structure 607.

In the drawing, the window 1 data structure 603 contains the tab data for tab 611, tab 613 and tab 615. Window 2 data structure 605 contains the tab data for tab 621, tab 623 and tab 625. Window 3 data structure 607 contains the tab data for tab 631, tab 633 and tab 635. As mentioned above, in one preferred embodiment, the tab data syntax is SMART_TAB_DATA [windowID, TabID, TabGroupID, TabContent (keywords, metadata, image, video), TabRuningSessionList]. Although for ease in illustration, only the tab group ID is depicted, other tab data would typically be included and within each tag group the Tab Content field for respective web pages will match the criteria for the tab group. Each of the members of tab group 1 might have key words about a recent current event in the TabContent field. The members of tab group 2 might have an indication that video data was running (in their associated windows) in the TabContent field. The members of tab group 3 might have key words about a pet that the user is considering buying in the respective TabContent fields. Each of the TabContent fields may also have other data in addition to the data which matches the tab group criteria. That is, the TabContent fields would typically include both matching and non-matching tab data.

Figure 7:
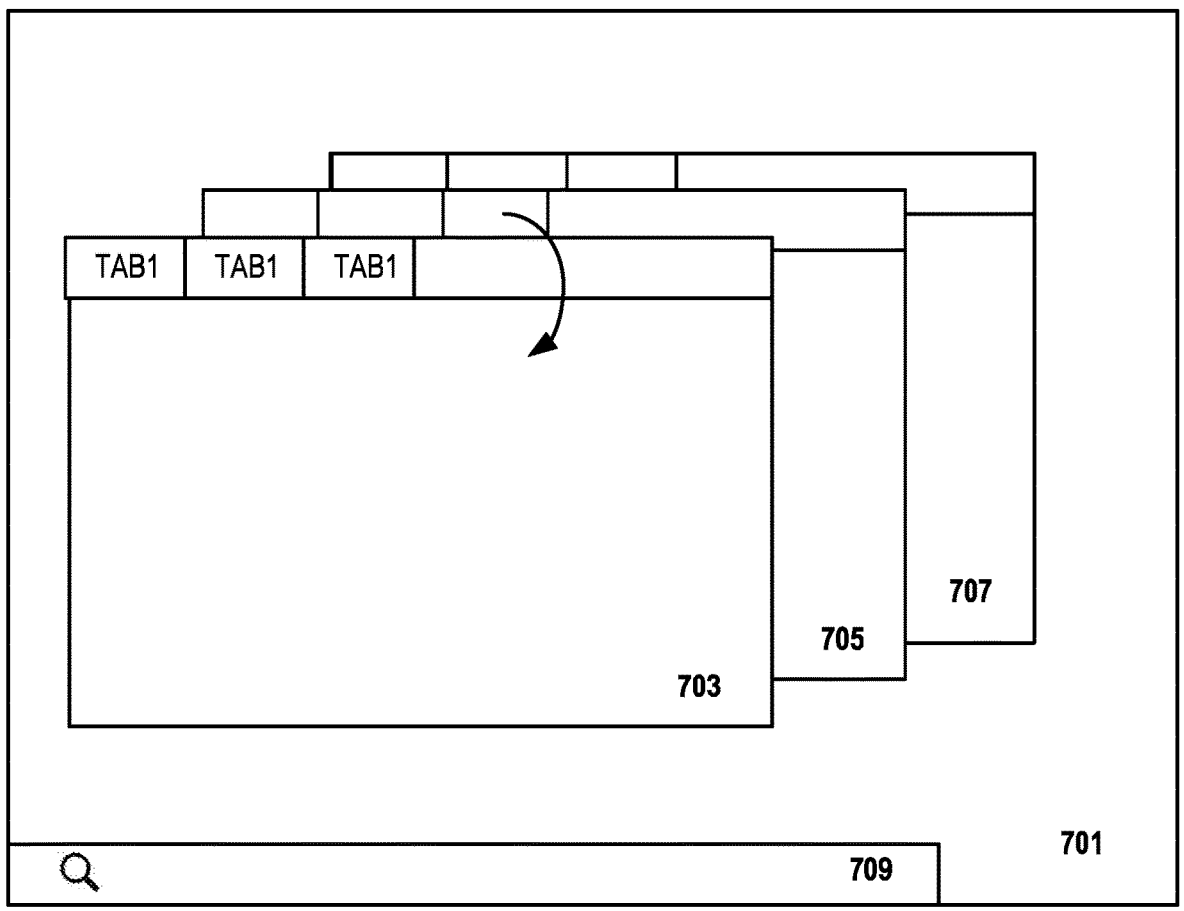
FIG. 7 shows a user interface for use in embodiments of the invention.

In FIG. 7, a user interface is depicted for use in embodiments of the invention. The browser window 701 includes three windows 703, 705 and 707 each displaying a web browser window with a set of tabs for a respective tab group. In the drawing, window 703 is the active window and tab 1 is the active tab displaying the web page that the user has searched for or followed using a hyperlink. In one embodiment, as the user selects web pages in different tab groups, the active window changes. For example, window 705 would become the active window if the user elects to browse a web page that belongs in the tab group displayed in that window.

In embodiments, when a user opens a new page, it is automatically classified into a tag group. If the new page cannot be classified in an existing tab group, a new browser panel is opened in which unclassified pages are placed. For instance, it will open a new tab in new group container. With each new web page, if it is classified into a tab group, the tab group comes to the surface and the web page displayed as the active tab. Otherwise, a window in which unclassified pages are placed comes to the surface of the user interface. In other embodiments, the window behavior, e.g., switching between tab group windows is user configurable.

Also displayed in the drawing is search bar 709 which is used for displaying a group of open web pages which meet the search criteria in a set of windows (not shown). The search feature 709 is used in some preferred embodiments and accepts a natural language phrase for and uses the EBTM algorithm module and EBTM context monitor module in preferred embodiments. Members of the search set of windows can be dragged to one of the tab group windows 703, 705, 707 so that they become members of the respective tab group. Alternatively, members of the search set can be dragged to one of the windows to create a new tab group. Further, as depicted by the dotted line, a tab in one tab group can be dragged from one window 705 to another window 703 causing a change in the members of the tab groups.

In response to the drag and drop operation, if a new web page possesses criteria not in the existing tab group, i.e., inconsistent with the existing tab group criteria, the EBTM will attempt to determine the user intent for the change and display a proposed set of tab group criteria for the new tab group, i.e. now that it includes a new web page, for user ratification. Similarly, if a tab is removed from a tab group, this may also change the user intent for the tab group criteria of the tab group. When a new tab group is proposed by the user action of dragging the windows together, the EBTM will display a proposed set of tab group criteria for the new tab group. Determining the user intent will be aided in the last case by the search terms entered into the search bar 709.

One skilled in the art will recognize that other user interfaces for displaying tab groups such as a tree or list view with the tab groups therein and that similar actions, e.g., dragging and dropping a node in the tree from one tab group to another will induce similar actions on the part of the EBTM.

The tab groups are based on intelligent grouping rules. Some rules are provided with the EBTM for selection by the user. These rules can be simply selected by the user and used "as is" or can serve as a template for new or modified rules. In embodiments of the invention, the tab groups are dynamic. At any time, the user can provide a new set of rules by selecting a provided rule and modifying it, by using a search feature to find open or recent closed web pages and selecting among the web pages for a new tab group or by entering in a new tab group rule set, e.g., by a natural language phrase or command in a search engine syntax.

As an example, the user may plan three main activities during a current browsing session: listening to music (and watching music videos), shopping for a mountain bike and planning an upcoming European vacation. The user wants web pages related to each of the activities to be in a separate tab group in the browser. Thus, the user issues requests for three new tab groups: "group all tabs playing audio/video", "group all tabs where I am looking for bicycle prices", "group all tabs where I am looking for Europe trip plans".

The "group all tabs playing audio/video" tab group would be collated using the EBTM demon script module and the EBTM Smart Tab module. The tab groups "group all tabs where I am looking for bicycle prices" and "group all tabs where I am looking for Europe trip plans" would be collated using the browsing content monitor and the EBTM Smart Tab module. Each of the tab groups can have a specified time duration or a session duration in natural language, e.g., for the next hour, the next day, the next week, permanent, or until the browser is closed, signifying the end of the session. Continuing the example above, the user may expect that he will often be listening to music and so that tab group should be designated as permanent, while the bike parts are to be ordered today and so that tab group is designated as for the web session and the Europe vacation is in a month and so that would be a appropriate duration for that tab group.

Depending on the preferences set in the user profile and set in the current browser session, the browser content monitor and session analyzer may handle only a selected group of the browser window variables available for monitoring. For example, the user may configure the EBTM to ignore web page content not already specified in tab group criteria in the user profile for a web session in which the user expects be limited to a standard set of tasks. That is, the user can essentially "shut off" the EBTM function of suggesting new tab groups, while enjoying the function of automatically assigning the web pages to the tab groups already in the user profile. However, in the inventors' opinion, the dynamic mode in which the EBTM looks at recent history, the content in already running windows and those in recent history and improves upon the user profile by learning the user preferences and intent is the mode in which most users will choose to operate.

Other user preferences available in embodiments of the invention concern how web pages should be added to tab groups. In one setting, the EBTM automatically adds the new web pages to the closest tab groups based on the tab group criteria; in another setting the new web pages are automatically added to a tab group if the web page characteristics are within a threshold of similarity. Another setting starts a new tab group of unclassified web pages to let user add unclassified web pages to an existing tab group, or to start a new tab group criteria.

One setting adds the web pages to tab groups once it is no longer the "active" web page in the browser, that is, the web page that has user focus.

Embodiments of the invention use user intent for creating tab groups and the associated tab group criteria. There are many ways of establishing user intent within the spirit and scope of the invention. The user has many methods to set up the tab group, either originally, by selecting a service profile template, by modifying the service profile template or by dynamically requesting a new tab group by describing the tab group criteria. The user can use the user interface to create or modify the tab groups, e.g. by selecting open web pages found using a search function. The user performs a tab grouping action, e.g., moving open web pages to new tab group. Also available to the user is to manually change the membership of web pages in the respective tab groups, e.g., by a drag and drop of web pages between tab groups.

Further, the system proposes a new tab groups based on the content of open/recently open web pages. The user ratifies and/or modifies the proposed tab group parameters (thus determining user intent) and the system begins assigning web pages to the newly formed tab group.

In embodiments of the invention, the EBTM uses a "measure of similarity" to determine how similar the open web pages must be to suggest a new tab group criteria as well as when new web pages satisfy existing tab group criteria. In the user interface, the "measure of similarity" may be expressed as a confidence value between 0-1. The closer the confidence value is to 1, the more similar the pages are. The user can define a first threshold for adding new web pages to an existing web page criteria and a second threshold for creating a new tab group criteria. For example, a user may set a threshold value to 0.8 for existing tab group. Thus, if the model is confident 80% that a web page context and content are similar to an existing tab group criteria the web page will be added to the tab group. The confidence level is based on how much the user wants to rely on the EBTM to automatically group web pages. The higher the confidence level, the fewer pages will be grouped or the fewer new tab groups will be suggested. By having independent thresholds, the user can use the EBTM for organizing web pages in the existing tab groups, but essentially shut off the capability of suggesting new tab groups by selecting a very high threshold. There are many techniques known to the art for determining the "similarity" of web page content, either semantically or on a cluster basis. The model selected will differ according to the embodiment of the invention. For example, the IBM Watson™ suite of products have many tools for determining semantic similarity and confidence levels which can used in embodiments of the invention.

While the Watson™ suite of products is used in some illustrative embodiments, in other embodiments the machine learning is a neural network based model that is trained through a supervised or unsupervised machine learning operation. The neural network model may be a convolutional neural network (CNN), a recurrent neural network (RNN), Long Short-Term Memory (LSTM) neural network, or any other type of neural network model architecture that is currently known or later developed. Moreover, in some illustrative embodiments, other artificial intelligence based systems, rule based systems, or the like, may be utilized to operate on features extracted from a security incident and corresponding security knowledge graph to predict a disposition of the security incident. Other types of artificial intelligence based systems that may be used in embodiments of the illustrative embodiments include random forests, bagged Bayesian networks, gradient boosted trees, and the like.

Figure 8:
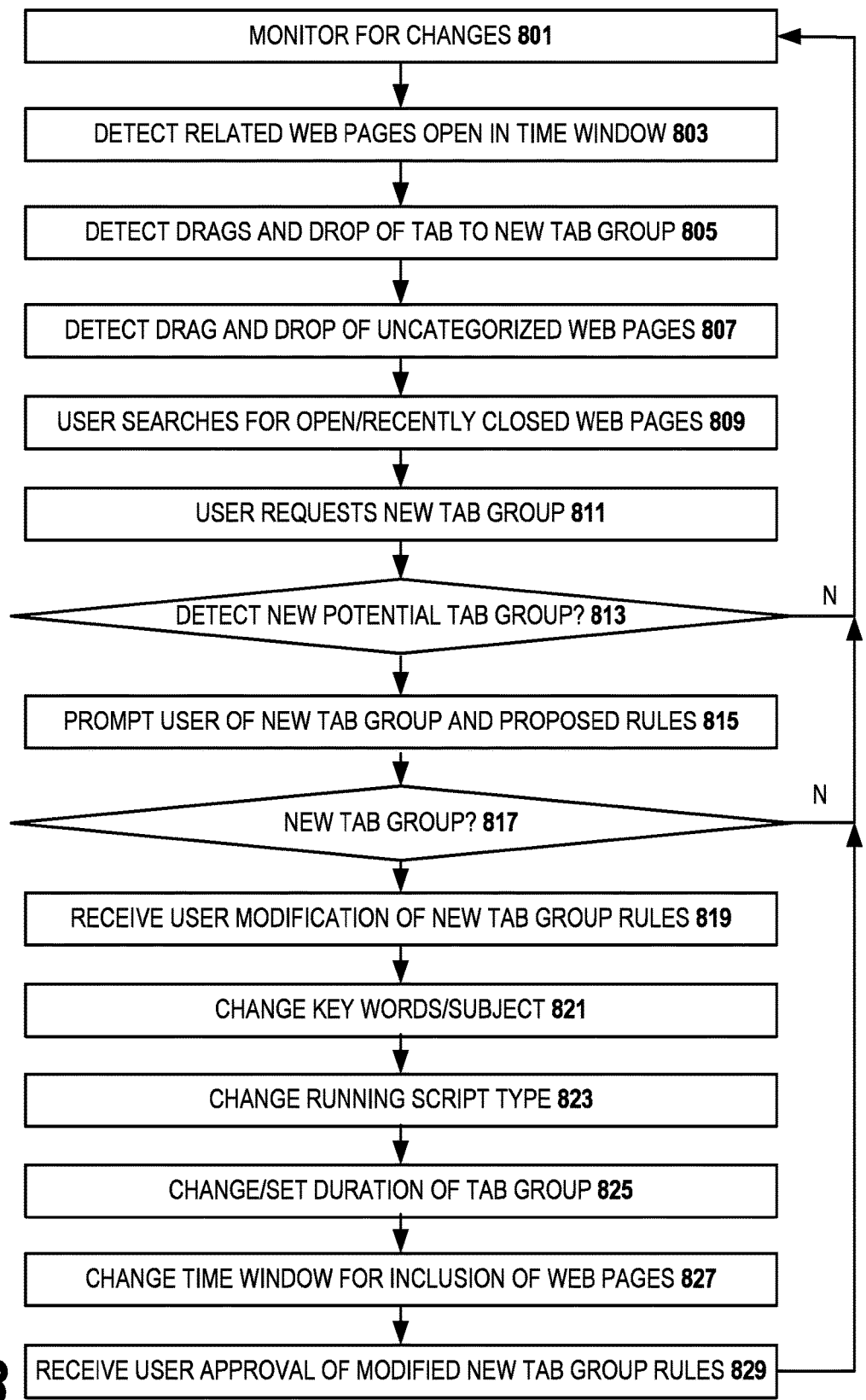
FIG. 8 depicts an exemplary process explaining the principles of the invention in one embodiment.

FIG. 8 depicts an exemplary process explaining the principles of the invention in one embodiment. In step 801, the EBTM monitors for changes to the browser interface for example indicating that a new tab group is to be formed, the membership of an existing tab group has changed or that changes to existing tab group criteria should be proposed. For example, the EBTM can detect that a set of related web pages are open (or have been opened) in the time window defined for creating a tab group, in step 803. Alternatively, the EBTM can detect a drag and drop of a tab to new tab group in step 805. The drag and drop could indicate a change of a tab from one tab group to another tag group. For example, the user has a tab group rule that all web pages including audio should be included in a given tab group. Next, the user moves one of the tabs to a research tab group that the user is constructing on a given topic because the audio is on the research topic. The EBTM will learn the user intent and propose to the user that web pages which contain audio but are on the research topic should be moved to the research tab group. That is, the EBTM will learn a rule for a web page that satisfies two different tab groups for which of the two tab groups to group a new web page into.

As another example, the EBTM can detect the drag and drop of uncategorized web pages into a tab group, step 807, e.g., the user drags a page retrieved by use of the browser search bar and displayed in the active area to a given tab group. If the EBTM detects a pattern in the unclassified web pages dropped on the tab group, it will propose a change to the tab group criteria. In another example, selected ones of the unclassified web pages can be dragged and dropped on a given web page to form a new tab group. The EBTM will learn the patterns and commonality of the web pages that the user has selected for the new tab group and will propose a set of tab group criteria for the new tab group.

The EBTM will also act on user searches for open/recently closed web pages, step 809, e.g., when the user enters search criteria into the search feature (709, in FIG. 7). Another instance is when the EBTM detects a user request to create a new tab group, step 811, e.g., a natural language request. If the system does not detect any of these events which indicate the potential creation of a new tab group or the modification of existing tab criteria, step 813, the EBTM resumes monitoring for changes in step 801.

If the potential creation of a new tab group or the modification of existing tab criteria is indicated, the EBTM prompts the user of a potential new tab group or changed tab criteria for an existing tab group and the proposed rules in step 815. In embodiments, where changes to existing tab criteria are indicated, a before and after panel showing the changes is presented to the user. If the user indicates that he does not want a new tab group or to change an existing tab group criteria, the process continues monitoring, step 801.

If in response to the prompt, the user indicates that the user wants to create a new tab group in step 817, the process continues to accept user input regarding the possible modification of the proposed rules. For example, in step 819, the EBTM receives user modification of new tab group rules. In step 821, the user input indicating a change to key words or the subject of the tab group is detected. In step 823, the running script type is changed according to user input. In embodiments, the EBTM, step 825 allows the user to change or set the duration of the tab group. For example, the user may wish that the tab group only be effective for this session. As another example, the user may decide that the search will likely be repeated and want to set a new permanent tab group. Embodiments of the invention also allow the user to change the time window for inclusion of web pages in the tests used to determine similarity of open web pages, that is, to propose a new tab group. For example, one rule is to only consider currently open web pages. Another rule is to include the web pages which have been opened within the current web session or those which have been open for a selected time period, e.g., opened in the past hour.

In step 824, the EBTM receives user approval of the modified new tab group rules and returns to monitor (step 801) for any changes that indicate that a new tab group, or changes to an existing tab group may be indicated. In preferred embodiments, where the EBTM is dynamically providing a new rule or criteria for grouping tabs in a current session, a natural language prompt and user request is used. Using the Watson™ services like Watson Conversation eliminates the need to provide the natural language capability within the EBTM code. The sessions can be user defined using natural language definitions like either time based e.g., "for the next two hours, please group all opened web pages which relate to mountain bikes which have reviews and/or prices in a window"?, or a task based such as "until I work on the music tab group". That is, the session is dependent on other tasks, e.g., when a new browser task is initiated by the user.

By default, every user action will be used for learning, proposing and updating the dynamic tab group rules. However, in embodiments, the user can also instruct to ignore either all or a particular type of user action in a particular web session or certain time frame. Further, the user can instruct the EBTM only to propose a new tab group rule if a certain confidence level has been reached, e.g., the user has repeated a drag and drop operation of content related pages a specified number of times. As above, the user instructions are preferably given as natural language instructions.

The order of steps in which the method is described is not intended to be construed as a limitation, and any number of the described method steps may be combined in any order to implement the method, or an alternate method. Additionally, individual steps may be deleted from the method without departing from the spirit and scope of the embodiments of the invention.

The present invention has many advantages over the prior art. Tab group criteria are based on user intent. The system allows the user to construct the rules dynamically and for user specified sessions. The system observes the user behavior, suggests when to modify existing tab group rules and suggests new tab groups based on behavior such as session behavior or behavior related to regrouping the tabs. Feedback from the user based on the system proposals allows the system to learn when new detected patterns should be used to define these dynamic rules. As user behaviors or preferences can change over a period of time, these dynamic rules can more accurately reflect the true intent of user with the tab groupings.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A computer-implemented method for dynamically grouping browser tabs in a web browser user interface, comprising:
   analyzing web page content of a plurality of open web page tabs in a web browser displayed on a display of a computer;
   dynamically receiving sets of tab group criteria, each set of tab group criteria for arespective tab group;
   based on the analyzing, determining which ones of the plurality of open web page tabs respectively satisfy a set of tab group criteria;
   grouping the plurality of open web page tabs into respective tab groups based on the determination, wherein at least one tab group has a tab group criteria which contains time criteria which limit the at least one tab group to be in effect for a non-recurring, predetermined duration;
   presenting the tab groups in the web browser display, each tab group display containing tabs representing a subset of the plurality of open web page tabs which satisfy respective set of tab group criteria;
   learning, by a machine learning process, user browsing behavior to propose a new set of tab group criteria for a new tab group;
   responsive to user input, excluding types of user actions from the learning; and
   proposing via the user interface, the new set of tab group criteria for the new tab group when a certain confidence level is reached by the learning.

2. The method as recited in claim 1, further comprising presenting a search feature in the user interface, and responsive to a user search to the search feature conducting a search among a set of open web pages for open web pages within the set of open web pages that satisfy the user search.

3. The method as recited in claim 1, wherein analyzing web page content further comprises creating a set of web page characteristics for each open web page and storing the sets of web page characteristics in a cache separate from a browser cache.

4. The method as recited in claim 3, wherein the set of web page characteristics are used for the grouping of the plurality of open web page tabs into respective tab groups.

5. The method as recited in claim 1, further comprising:
   analyzing user actions with respect to individual web pages and a first tab group;
   determining that the user actions with respect to the individual web pages are inconsistent with a set of tab group criteria associated with the first tab group;
   responsive to the determination that the user actions with respect to the individual web pages are inconsistent with the set of tab group criteria associated with the first tab croup, dynamically determining a new set of tab group criteria for the first tab group;
   prompting a user to accept the new set of tab group criteria for the first tab group; and
   responsive to user input, adding the new set of tab group criteria to the sets of tab group criteria.

6. The method as recited in claim 5, wherein the user actions are at least one of dragging a web page to the first tab group and dragging a web page away from the first tab group.

7. The method as recited in claim 1, further comprising:
   analyzing web page content of a second plurality of open web page tabs in a web browser displayed on a display of a computer, the web page content of the second plurality not satisfying the sets of tab group criteria;
   dynamically determining a new set of tab group criteria during a web browsing session for at least a subset of the second plurality;
   prompting a user to accept the new set of tab group criteria for a new tab group; and
   responsive to user input, adding the new set of tab group criteria to the sets of tab group criteria.

8. The method as recited in claim 7, further comprising:
   in response to user input, specifying a second running time window, the second time window staring from and running prior to a current time, during which open web page tabs must be either open and have been opened and closed for determining a new set of tab group criteria; and
   using open web page tabs within the second, user specified time window as the second plurality of open web page tabs used for determining the new set of tab group criteria.

9. The method as recited in claim 7, wherein time criteria for a first tab group which limits the first tab group to be in effect for a first user specified time window is different from time criteria for a second tab group which limits the second tab group to be in effect for a second user specified time window.

10. The method as recited in claim 7, wherein the determination for grouping open web pages for an existing tab group criteria is based on a first user defined threshold of similarity and the determination for a new set of tab group criteria is based on a second user defined threshold of similarity, wherein the first and second user defined thresholds are different.

11. Apparatus, comprising:
    a processor; computer memory holding computer program instructions executed by the processor for dynamically grouping browser tabs in a web browser user interface, the computer program instructions comprising:
       program code, operative to analyze web page content of a plurality of open webpage tabs in a web browser displayed on a display of a computer;
       program code, operative to dynamically receive sets of tab group criteria, each set of tab group criteria for a respective tab group;
       program code, operative to determine which ones of the plurality of open webpage tabs respectively satisfy a set of tab group criteria;
       program code, operative to group the plurality of open web page tabs into respective tab groups based on the determination, wherein at least one tab group has a tab group criteria which contains time criteria which limit the at least one tab group to be in effect for a non-recurring, predetermined duration;
       program code, operative to present the tab groups in the web browser display, each tab group display containing tabs representing a subset of the plurality of open webpage tabs which satisfy a respective set of tab group criteria;
       program code, operative to learn user browsing behavior to propose a new set of tab group criteria for a new tab group;
       program code, responsive to user input operative to exclude types of user actions from the learning; and
       program code, operative to propose via the user interface the new set of tab group criteria for the new tab group when a certain confidence level is reached by the learning code.

12. The apparatus as recited in claim 11, further comprising:
   program code, operative to analyze user actions with respect to individual web pages and a first tab group;
   program code, operative to determine that the user actions with respect to the individual web pages are inconsistent with a set of tab group criteria associated with the first tab group;
   program code, operative to dynamically determine a new set of tab group criteria for the first tab group;
   program code, operative to prompt a user to accept the new set of tab group criteria for the first tab group; and
   program code, operative to add the new set of tab group criteria to the sets of tab group criteria.

13. The apparatus as recited in claim 11, further comprising:
   program code, operative to analyze web page content of a second plurality of open web page tabs in a web browser displayed on a display of a computer, the web page content of the second plurality not satisfying the sets of tab group criteria;
   program code, operative to dynamically determine during a web browsing session a new set of tab group criteria for at least a subset of the second plurality;
   program code, operative to prompt a user to accept the new set of tab group criteria for a new tab group; and
   program code, operative to add the new set of tab group criteria to the sets of tab group criteria.

14. The apparatus as recited in claim 13, further comprising:
   program code, operative to learn which sets of tab group criteria the user has accepted; and
   program code, operative to dynamically determine a new set of tab group criteria based at least in part on the accepted sets of tab group criteria.

15. The apparatus as recited in claim 13, further comprising:
   program code, operative to accept user input to specify a second, user specified time window, the second time window defining a running time period starting from and running prior to a current time, during which currently open web page tabs and recently closed web page tabs have been opened for determining a new set of tab group criteria; and
   program code, operative to use web page tabs opened within the second, user specified time window as the second plurality of open web page tabs used for determining a new set of tab group criteria.

16. The apparatus as recited in claim 15, wherein the first user specified time window is selected according to user input from one of the group of a current web session, a specified number of web sessions or a permanent time window.

17. A computer program product in a non-transitory computer readable medium for use in a data processing system, the computer program product holding computer program instructions executed by the data processing system for dynamically grouping browser tabs in a web browser user interface, the computer program instructions comprising:
   program code, operative to analyze web page content of a plurality of open webpage tabs in a web browser displayed on a display of a computer;
   program code, operative to dynamically receive sets of tab group criteria, each set of tab group criteria for a respective tab group;
   program code, operative to determine which ones of the plurality of open webpage tabs respectively satisfy a set of tab group criteria;
   program code, operative to group the plurality of open web page tabs into respective tab groups based on the determination, wherein at least one tab group has a tab group criteria which contains time criteria which limit the at least one tab group to be in effect for a non-recurring, predetermined duration,
   program code, operative to present the tab groups in the web browser display, each tab group display containing tabs representing a subset of the plurality of open webpage tabs which satisfy a respective set of tab group criteria;
   program code, operative to learn user browsing behavior to propose a new set of tab group criteria for a new tab group;
   program code, responsive to user input operative to exclude types of user actions from the learning; and
   program code, operative to propose via the user interface, the new set of tab group criteria for the new tab group when a certain confidence level is reached by the learning code.

18. The computer program product as recited in claim 17, further comprising:
   program code, operative to analyze user actions with respect to individual web pages and a first tab group;
   program code, operative to determine that the user actions with respect to the individual web pages are inconsistent with a set of tab group criteria associated with the first tab group;
   program code, operative to dynamically determine a new set of tab group criteria for the first tab group;
   program code, operative to prompt a user to accept the new set of tab group criteria for the first tab group; and
   program code, operative to add the new set of tab group criteria to the sets of tab group criteria.

19. The computer program product as recited in claim 17, further comprising:
   program code, operative to search for open web pages which satisfy a user specified search criteria;
   program code to display a set of open web pages which satisfy the search criteria;
   program code, operative to accept user input to drag and drop selected ones of the set of open web pages together which satisfy the search criteria to form a new tab group;
   program code, operative to dynamically determine a new set of tab group criteria for the new tab group;
   program code, operative to prompt a user to accept the new set of tab group criteria for the new tab group; and
   program code, operative to add the new set of tab group criteria to the sets of tab group criteria.

20. The computer program product as recited in claim 17, wherein the program code is a plug-in to a web browser.

21. The computer program product as recited in claim 17, further comprising:
   program code, operative to analyze web page content of a second plurality of open web page tabs in a web browser displayed on a display of a computer, the web page content of the second plurality not satisfying the sets of tab group criteria;
   program code, operative to dynamically determine during a web browsing session a new set of tab group criteria for at least a subset of the second plurality;
   program code, operative to prompt a user to accept the new set of tab group criteria for a new tab group; and program code, operative to add the new set of tab group criteria to the sets of tab group criteria.

22. The computer program product as recited in claim 21, further comprising computer code, operative to present a natural language interface to a user for accepting a new set of tab group criteria associated with a new tab group and a time criteria which limits the new tab group to be in effect for a user specified time window.

* * * * *